United States Patent [19]

Kubota et al.

[11] Patent Number: 5,001,087

[45] Date of Patent: Mar. 19, 1991

[54] INSULATING POWDER AND COMPOSITIONS FOR RESISTANT COATING

[75] Inventors: Tutomu Kubota; Shu Sekihara, both of Oume; Juji Ishigame, Nishitama, all of Japan

[73] Assignee: Sumitomo Metal Mining Company Limited, Tokyo, Japan

[21] Appl. No.: 250,116

[22] Filed: Sep. 28, 1988

[51] Int. Cl.$^5$ .................................................. C03C 8/14
[52] U.S. Cl. .......................................... 501/17; 501/18; 501/20; 501/26; 501/32; 501/79
[58] Field of Search ........................ 501/26, 79, 17, 18, 501/20, 32

[56] References Cited

U.S. PATENT DOCUMENTS 4,649,125  3/1987  Takeuchi et al. ...................... 501/17
4,743,302  5/1988  Dumesnil et al. ...................... 501/32
4,814,304  3/1989  Takeuchi et al. ...................... 501/79

FOREIGN PATENT DOCUMENTS 2129638  1/1972  Fed. Rep. of Germany ........ 501/26
3002353  7/1980  Fed. Rep. of Germany ........ 501/15
54-147782  11/1979  Japan ..................................... 501/26
59-164649  9/1984  Japan ..................................... 501/15

Primary Examiner—Mark L. Bell
Assistant Examiner—Deborah Jones
Attorney, Agent, or Firm—Watson, Cole, Grindle & Watson

[57] ABSTRACT

An insulating powder for the formation of a resistant coating is disclosed which comprises a glass powder consisting of 60 to 70% by weight of ZnO, 19 to 25% by weight of $B_2O_3$, and 10 to 16% by weight of $SiO_2$. A composition for the formation of a resistant coating is also disclosed which comprises the powdered oxide of a platinum-family element; the powder of at least one oxide selected from the group consisting of indium oxides, tin oxides, and cadmium oxides; a glass powder capable of forming a crystalline phase on being fired; a ceramic powder; and an organic vehicle.

12 Claims, No Drawings

INSULATING POWDER AND COMPOSITIONS FOR RESISTANT COATING

BACKGROUND OF THE INVENTION

1. Field of the Invention

This invention relates to an insulating powder and compositions suitable for the formation of a resistant coating on a non-oxide ceramic substrate, particularly an aluminum nitride substrate possessing a low thermal expansion coefficient and used for hybrid IC circuit devices.

2. Description of the Prior Art

In recent years, as insulating substrates for hybric IC circuit devices, use of substrates of aluminum nitride, silicon carbide, and silicon nitride in the place of those of alumina has been advocated. In the case of the aluminum nitride substrate, when a resistant coating is formed thereon by applying thereon a composition consisting of an electroconductive powder, glass frit, and an organic vehicle and heretofore used on the conventional alumina substrate, which has been firing the coated substrate, the produced resistant coating lacks stability of quality because the aluminum nitride and the glass react with each other with evolution of a gas. As a solution for this problem, the use in the composition of an insulating powder comprising a crystalline glass frit having as a main ingredient thereof $SiO_2$, $Al_2O_3$, CaO, ZnO, or $TiO_2$ and not more than 20 parts by weight, used on 100 parts by weight of the glass frit, of at least one member selected from the group consisting of alumina, magnesia, mullite, forsterite, stearite and cordierite has been proposed in Japanese Patent Application Disclosure SHO 62(1987)-21,630.

It is customary to vary the magnitude of resistance to be offered by the produced resistant coating by varying the mixing ratio of the electroconductive powder in the composition prepared for the formation of the resistant coating. Where the glass frit mentioned above is used, an increase in the magnitude of resistance is attained by decreasing the amount of the electroconductive powder and conversely increasing the amount of the glass frit. The amount of glass is increased and the firing temperature is consequently elevated in proportion as the magnitude of resistance increases. Thus, the applied layer of the composition on the substrate, while being fired, is liable to effervesce before the glass is melted and crystallized, rendering it difficult to produce a resistant coating of stable quality.

SUMMARY OF THE INVENTION

An object of this invention is to provide an insulating powder, comprising glass frit capable of forming crystalline glass on being fired at a relatively low temperature and suitable for use in a composition of which a resistant coating is formed.

Another object of this invention is to provide compositions for the formation of a resistant coating, which permits the glass content thereof to be substantially fixed in a relatively small ratio and ensures production of a resistant coating of stable quality.

The first aspect of this invention consists in an insulating powder for the formation of a resistant coating, comprising a glass powder consisting of 60 to 70% by weight of ZnO, 19 to 25% by weight of $B_2O_3$, and 10 to 16% by weight of $SiO_2$ and optionally containing not more than 10% by weight of a vitrifying component selected from the group consisting of $Al_2O_3$, $Sb_2O_3$, BaO, PbO, MgO, CaO, $SnO_2$, $Na_2O$, $K_2O$, and $Li_2O$. The insulating powder, when necessary, any additionally incorporate therein at least one ceramic powder selected from the group consisting of zircon, β-eucryptite, cordierite, β-spodumene, lead titanate and other ferroelectric perovskite compounds in an amount of not more than 52% by weight, based on the total amount of the ceramic powder and the glass powder.

The second aspect of this invention is directed to a composition for the formation of a resistant coating, which comprises a powdered oxide of an platinum-family element; an indium oxide powder, tin oxide powder, or a cadmium oxide powder doped with indium oxide; the aforementioned glass powder; the aforementioned ceramic powder; and an organic vehicle.

The glass powder mentioned above forms crystals at 750° to 860° C., the indium oxide powder is doped with at least one member selected from the group consisting of tin oxide, titanium oxide, and zinc oxide, and the tin oxide is doped with at least one member selected from the group consisting of antimony oxide and arsenic oxide.

DETAILED DESCRIPTION OF THE INVENTION

In the three main components of the glass powder contemplated by the present invention, ZnO is an essential component for the formation of a crystalline phase of willemite ($Zn_2SiO_4$). The amount of this component to be used is fixed in the range of 60 to 70% by weight for the following reason. If this amount is less than 60% by weight, the proportion of the crystalline phase in the glass is not sufficient and the vitreous phase and the crystalline separate from each other, rendering it difficult to have these two phases uniformly dispersed into each other at a low firing temperature. If the amount exceeds 70% by weight, the component no longer participates in the vitrification.

Then, $B_2O_3$ promotes vitrification and serves as an essential component for the formation of the vitreous phase. If the amount of this component to be used is less than 19% by weight, the produced vitreous phase is deficient in quantity and that electroconductive coating produced by firing is deficient in strength. If the amount exceeds 25% by weight, the crystalline phase in the glass matrix is rather insufficient than otherwise and is liable to react with the aluminum nitride substrate and entail effervescence.

$SiO_2$ participates in the formation of $Zn_2SiO_4$ jointly with ZnO. If the amount of this component to be used is less than 10% by weight, the softening point is unduly low and the amount of the crystalline phase to be formed is not sufficient and the glass powder is liable to effervesce. If the amount exceeds 16% by weight, the pour point of the glass rises unduly and the amount of the crystalline phase to be produced is not sufficient.

When ZnO, $B_2O_3$, and $SiO_2$ as the main components of the glass powder of the present invention are used respectively in the proportions mentioned above, the glass powder is enabled to form a vitreous phase incorporating a crystalline phase in a narrow temperature range of about 750° to 860° C.

This glass powder brings about the same effect as described above when it incorporates, besides the three main components ZnO, $B_2O_3$, and $SiO_2$, at least one member selected from the group of popularly used vitrifying components such as $Al_2O_3$, $Sb_2O_3$, BaO, PbO, MgO, CaO, SnO$_2$, Na$_2$O, K$_2$O, and Li$_2$O in an amount of not more than about 10% by weight.

The ferroelectric perovskite compounds such as zircon (ZrSiO$_4$), $\beta$-eucryptite (Li$_2$O.Al$_2$O$_3$.2SiO$_2$), cordierite (2MgO.2Al$_2$O$_3$.5SiO$_2$), $\beta$-spodumene (Li$_2$O.Al$_2$O$_3$.4SiO$_2$), and lead titanate (PbTiO$_3$) which are usable as ceramic powders in the present invention possess thermal expansion coefficients closely approximating to that of aluminum nitride and are not readily vitrified and are thermally stable. The ceramic powder, therefore, serves to decrease relatively the amorphous portion in the crystallized glass. If the amount of the ceramic powder exceeds 52% by weight, based on the total amount of the ceramic powder and the glass powder, the electroconductive coating obtained by firing is deficient in strength. Thus, the upper limit of the amount of the ceramic powder is fixed at 52% by weight.

The particle diameter of the glass powder affects the growth of crystals in such manner that the glass powder is desired to possess an average particle diameter approximately in the range of 2 to 5 $\mu$m. Advantageously, the ceramic powder has an average particle diameter of not more than 2 $\mu$m.

The oxide of a platinum-family element such as, for example, RuO$_2$, RhO$_2$, OsO$_2$, IrO$_2$, or PtO$_2$ may be used as an electroconductive powder. These oxides may be used either singly or in the form of a mixture of two or more members.

Besides the glass powder, the ceramic powder, and the electroconductive powder to be used in the composition for the formation of the resistant coating of this invention, In$_2$O$_3$ may be used as an indium oxide and CdO as a cadmium oxide. CdO$_2$ is no desirable cadmium oxide because it is explosively decomposed into CdO and O$_2$ at a temperature in the range of 180° to 200° C. SnO or SnO$_2$ is used as a tin oxide. TiO, Ti$_2$O$_5$, Ti$_2$O$_3$, TiO$_2$, or Ti$_n$O$_{2n-1}$ (wherein n is an integer in the range of 4 to 9) may be used as a titanium oxide. Sb$_2$O$_3$ or Sb$_2$O$_4$ may be used as an antimony oxide. Sb$_2$O$_5$ is no desirable antimony oxide because it liberates O at 380° C. and loses O$_2$ at 930° C.

The oxides of platinum-family elements which are usable as an electroconductive powder possess small magnitudes of resistivity as shown below.

|  | Resistivity ($\Omega \cdot$ m, at 300° K.) |
|---|---|
| RuO$_2$ | $0.4 \times 10^{-6}$ |
| RhO$_3$ | $10^{-6}$ |
| OsO$_2$ | $0.6 \times 10^{-6}$ |
| IrO$_2$ | $0.5 \times 10^{-6}$ |
| PtO$_2$ | $6 \times 10^{-6}$ |

In contrast, In$_2$O$_3$ is a semiconductor which closely approximates an insulator, CdO is an n-type semiconductor, and SnO and SnO$_2$ are resistors.

In the present invention, the magnitude of resistance offered can be varied by suitably combining such resistor and the oxide of a platinum-family element while keeping the total amount of the two components substantially constant. As the result, the mixing proportions of the glass powder and the ceramic powder can be kept substantially fixed. The resistant coating consequently obtained, therefore, acquire a substantially fixed quality in terms of adhesive force manifested by the resistant coating to the substrate and the swelling and shrinking ratios.

The indium oxide and the tin oxide do not always require any activating agent. Generally by the addition of an activating agent, the magnitude of resistance can be stably varied and the temperature coefficient can be adjusted either positively or negatively.

The activating agent is generally desired to be of an element whose ion has a radius closely approximating the radii of the metallic atoms comprising the indium oxide, tin oxide, and cadmium oxide and an electric charge +1 larger than the electric charges of such metallic ions. For example, In$^{3+}$ is a desirable ion for Cd$^{2+}$; Sn$^{4+}$, Ti$^{4+}$, or Zn$^{4+}$ for In$^{3+}$; and Sb$^{5+}$ or As$^{5+}$ for Sn$^{4+}$. By doping with one of the oxides satisfying the relation mentioned above, the magnitude of resistance and the temperature coefficient can be adjusted. In the case of the cadmium oxide, it is required to be doped with In$_2$O$_3$ as an activating agent.

The proportion of the sum of the powdered oxide of platinum-family element and the indium oxide, the cadmium oxide, or the tin oxide to the total of solids of the composition for the formation of the resistant coating is not tolerated to exceed 70% by weight at most. If this proportion exceeds this upper limit, the amount of the glass powder to be incorporated is insufficient even when the amount of the ceramic powder is decreased and, as the result, the produced resistant coating is deficient in strength. If the powdered oxide of platinum-family element accounts for an unduly large proportion in the sum of the powdered oxide of platinum-family element and the indium oxide, the cadmium oxide, or the tin oxide, the produced resistant coating betrays deficiency in strength. Thus, this proportion of the powdered oxide of platinum-family element is not allowed to exceed 50% by weight.

Optionally, the glass powder may additionally incorporate therein any of the metal oxides which have heretofore been used as a TCR adjusting agent in the composition for the formation of the resistant coating for the alumina substrate. As concrete examples of the TCR adjusting agent, copper oxide, manganese oxide, titanium oxide, vanadium oxide, manganese oxide, zirconium oxide, antimony oxide, and ferroelectric perovskite oxides may be mentioned.

Now, the present invention will be described more specifically below with reference to working examples, which are purely illustrative of, and not in the least limitative of, the present invention.

EXAMPLE 1

A composition for the formation of a resistant coating was prepared by mixing an electroconductive RuO$_2$ powder possessing an average particle diameter of 0.02 to 0.03 $\mu$m, a glass powder consisting of 65% by weight of ZnO, 20% by weight of B$_2$O$_3$, 10% by weight of SiO$_2$ and 5% by weight of PbO and possessing an average particle diameter of 2 $\mu$m and a softening point of 635° C., a ceramic powder of zircon having an average particle diameter of 1 $\mu$m, and a terpineol solution of ethyl cellulose as an organic vehicle in a varying percentage composition shown in Table 1.

On an aluminum nitride substrate, electrodes were formed of an Ag-Pd electroconductive composition and the composition mentioned above was applied by the screen printing method between the electrodes. The resultant composite was dried and then, in an air-filled belt type firing oven, fired at a peak temperature of 850° C. for a total period of 60 minutes including a peak time of 9 minutes, to give rise to a resistant coating 13 to 15

μm in thickness deposited on the substrate. The characteristic properties of the resistant coating are shown in Table 1.

TABLE 1

| | Composition (parts by weight) | | | Magnitude of resistance | TCR (ppm/°C.) | | Noise |
|---|---|---|---|---|---|---|---|
| | Glass | Zircon | $RuO_2$ | Vehicle | (Ω/□) | H | C | (dB) |
| 1 | 67.5 | 0 | 32.5 | 48 | 100 | −46 | −61 | −31 |
| 2 | 60.0 | 20.0 | 20.0 | 48 | 1.1K | −214 | −280 | −20 |
| 3 | 56.2 | 30.6 | 13.2 | 48 | 7.4K | −268 | −388 | −0.8 |

In the resistant coatings obtained after the firing, no sign of effervescence was observed and eduction of willemite crystals was recognized. Under a microscope, these crystals were found to possess particle diameters 10 to 50 μm and were observed to be fixed strongly to the substrate.

When a resistant coating was prepared by following the procedure described above, excepting the aforementioned glass powder additionally incorporated therein 5% by weight of $Sb_2O_3$ having an average particle diameter of 1 μm. This resistant coating could be effectively fired at a peak temperature of 780° C.

EXAMPLE 2

A composition for the formation of a resistant coating was prepared by mixing the same electroconductive powder, glass powder, ceramic powder, and organic vehicle as used in Example 1 and an $In_2O_3$ powder doped with about 10% by weight of $SnO_2$ in a varying percentage composition shown in Table 2.

On an aluminum nitride substrate, electrodes were formed with an Ag-Pd electroconductive composition and the aforementioned composition was applied by the screen printing method between the electrodes. The resultant composite was dried at 150° C. and then, in an air-filled belt type firing oven, fired at a peak temperature of 850° C. for a total period of 60 minutes including a peak time of 9 minutes. The resistant coating produced by the firing had a thickness of 15 to 17 μm. The characteristic properties of the produced resistant coatings and their compositions are shown in Table 2.

TABLE 2

| | Composition (parts by weight) | | | | | Magnitude of resistance | TCR (ppm/°C.) | | Noise |
|---|---|---|---|---|---|---|---|---|---|
| | $RuO_2$ | Sn—In | Glass | Ceramic | Vehicle | (kΩ/□) | H | C | (dB) |
| 1 | 18.0 | 2.0 | 60.0 | 20.0 | 48 | 1.1 | −34.5 | −72.3 | −15.4 |
| 2 | 12.0 | 8.0 | 60.0 | 20.0 | 48 | 9.6 | −170.5 | −190.2 | −3.2 |
| 3 | 7.0 | 13.0 | 60.0 | 20.0 | 48 | 120 | −243.2 | −292.4 | 16.2 |
| 4 | 4.6 | 15.4 | 60.0 | 20.0 | 48 | 920 | −357.3 | −379.2 | 27.6 |

From this table, it is clearly noted that the magnitude of resistance can be varied only by changing the mixing proportions of $RuO_2$ and the $SnO_2$-doped $In_2O_3$ without changing the mixing proportions of the glass powder and the ceramic powder.

EXAMPLE 3

A resistant coating possessing a thickness of 15 to 17 μm was prepared by following the procedure of Example 2, excepting a SnO powder possessing an average particle diameter of 0.1 μm and doped with about 10% by weight of $Sb_2O_3$ was used in the place of the $In_2O_3$ powder possessing an average particle diameter of 0.1 μm and doped with about 10% by weight of $SnO_2$.

The results are shown in Table 3.

TABLE 3

| | Composition (parts by weight) | | | | | Magnitude of resistance | TCR (ppm/°C.) | | Noise |
|---|---|---|---|---|---|---|---|---|---|
| | $RuO_2$ | Sb—Sn | Glass | Ceramic | Vehicle | (kΩ/□) | H | C | (dB) |
| 1 | 17.0 | 3.0 | 60.0 | 20.0 | 48 | 1.0 | −51.2 | −11.9 | −18.5 |
| 2 | 12.0 | 8.0 | 60.0 | 20.0 | 48 | 9.1 | −140.2 | −157.0 | −5.7 |
| 3 | 9.0 | 11.0 | 60.0 | 20.0 | 48 | 110 | −234.0 | −285.6 | −15.6 |
| 4 | 4.7 | 14.7 | 60.0 | 20.0 | 48 | 890 | −327.2 | −350.4 | 24.0 |

From the table, it is clearly noted that resistant coatings possessing varying magnitudes of resistance can be formed by only changing the ratio of $RuO_2$ to the $Sb_2O_3$-doped $SnO_2$.

By the use of the insulating powder of this invention for the formation of a resistant coating and the composition using the insulating powder, a resistant coating of substantially constant quality can be produced in the firing oven heretofore employed for the formation of an electroconductive film on an alumina substrate, at a firing temperature in the neighborhood of 800° C. without entailing the phenomenon of effervescence.

What is claimed is:

1. A composition for the formation of a resistant coating, consisting essentially of 4.6 to 50% by weight of the powdered oxide of a platinum-family element, wherein at least one member is selected from the group consisting of $RuO_2$, $RhO_2$, $OsO_2$, $IrO_2$, and $PtO_2$; 2 to 65.4% by weight of the powder of at least one oxide selected from the group consisting of indium oxides, tin oxides, and camium oxides; a glass powder capable of forming a crystalline phase on being fired, wherein said glass powder comprises 60 to 70% by weight of ZnO, 19 to 25% by weight of $B_2O_3$, and 10 to 16% by weight of $SiO_2$; a ceramic powder selected from the group of ferroelectric perovskite compounds consisting of zircon, β-eucryptite, cordierite, β-spondumene, and lead titanate and said ceramic powder is incorporated in said composition in an amount of note more than 52% by weight, based on the total amount of said glass powder and said ceramic powder; and an organic vehicle, wherein the sum of the amounts of said powdered oxide of the platinum-family element and the at least one oxide powder is 6.6% to 70% by weight, based on the total solids in said composition, and the sum of the amounts of the glass powder and the ceramic powder is 30 to 93.4% by weight, based on the total solids in said composition.

2. A composition according to claim 1, wherein the glass powder forms a crystalline phase in a range of about 750° to 860° C.

3. A composition according to claim 1, wherein said tin oxide is doped with at least one member selected from the group consisting of antimony oxides and arsenic oxides.

4. A composition according to claim 1, wherein said cadmium oxide is doped with an indium oxide.

5. A composition according to claim 1, wherein said glass powder possesses an average particle diameter in the range of 2 to 5 μm.

6. A composition according to claim 1, wherein the average particle diameter of said ceramic powder is not more than 2 μm.

7. An insulating powder for the formation of a resistant coating, consisting essentially of 4.6 to 50% by weight of the powdered oxide of a platinum-family element wherein at least one member is selected from the group consisting of $RuO_2$, $RhO_2$, $OsO_2$, $IrO_2$, and $PtO_2$; 2 to 65.4% by weight of the powder of at least one oxide selected from the group consisting of indium oxides, tin oxides, and cadmium oxides; a glass powder capable of forming a crystalline phase on being fired, wherein said glass powder comprises 60 to 70% by weight of ZnO, 19 to 25% by weight of $B_2O_3$, and 10 to 16% by weight of $SiO_2$; a ceramic powder selected from the group of ferroelectric perovskite compounds consisting of zircon, β-eucryptite, cordierite, β-spondumene, and lead titanate and said ceramic powder is incorporated in said composition in an amount of not more than 52% by weight, based on the total amount of said glass powder and said ceramic powder; and an organic vehicle, wherein said glass powder additionally incorporates therein not more than 10% by weight of at least one vitrifying component selected from the group consisting of $Al_2O_3$, $Sb_2O_3$, BaO, PbO, MgO, CaO, $SnO_2$, $Na_2O$, $K_2O$, and $Li_2O$, wherein the sum of the amounts of said powdered oxide of the platinum-family element and the at least one oxide powder is 6.6% to 70% by weight, based on the total solids in said composition, and the sum of the amounts of the glass powder and the ceramic powder is 30 to 93.4% by weight, based on the total solids in said composition.

8. A composition according to claim 7, wherein the glass powder forms a crystalline phase in a range of about 750° to 860° C.

9. A composition according to claim 7, wherein said tin oxide is doped with at least one member selected from the group consisting of antimony oxides and arsenic oxides.

10. A composition according to claim 7, wherein said cadmium oxide is doped with an indium oxide.

11. A composition according to claim 7, wherein said glass powder possesses an average particle diameter in the range of 2 to 5 μm.

12. A composition according to claim 7, wherein the average particle diameter of said ceramic powder is not more than 2 μm.

* * * * *

UNITED STATES PATENT AND TRADEMARK OFFICE
CERTIFICATE OF CORRECTION

PATENT NO. : 5,001,087
DATED : March 19, 1991
INVENTOR(S) : Tutomu KUBOTA et al.

It is certified that error appears in the above-identified patent and that said Letters Patent is hereby corrected as shown below:

On the title page between "[22] Filed: Sep. 28, 1988" and "[51]", please insert

--[30] Foreign Application Priority Data: February 18, 1988 (JP) Japan Applications No. 36232/63 and No. 36233/63--.

Signed and Sealed this

Fourth Day of August, 1992

Attest:

DOUGLAS B. COMER

*Attesting Officer*   *Acting Commissioner of Patents and Trademarks*